United States Patent [19]

Graether et al.

[11] Patent Number: 5,196,810
[45] Date of Patent: Mar. 23, 1993

[54] PLURAL OSCILLATOR CIRCUIT ARRANGEMENT FOR RAPIDLY RESETTING A COMPUTER CIRCUIT

[75] Inventors: Guenter Graether, Wiernsheim/Pinache; Werner Jundt, Ludwigsburg; Guenther Kaiser, Stuttgart, all of Fed. Rep. of Germany

[73] Assignee: Robert Bosch GmbH, Stuttgart, Fed. Rep. of Germany

[21] Appl. No.: 777,550

[22] PCT Filed: Oct. 25, 1990

[86] PCT No.: PCT/DE90/00810
 § 371 Date: Feb. 3, 1992
 § 102(e) Date: Feb. 3, 1992

[87] PCT Pub. No.: WO91/09361
 PCT Pub. Date: Jun. 27, 1991

[30] Foreign Application Priority Data

Dec. 9, 1989 [DE] Fed. Rep. of Germany ....... 3940745

[51] Int. Cl.$^5$ .......................... G06F 1/08; G06F 1/24; H03B 1/00; H03L 3/00
[52] U.S. Cl. .................. 331/49; 364/934.51; 364/934.4; 364/DIG. 2
[58] Field of Search .................. 331/46, 49; 364/934, 364/934.51, 934.4, DIG. 2

[56] References Cited

U.S. PATENT DOCUMENTS

| 4,868,525 | 9/1989 | Dias | 331/111 |
| 5,126,695 | 6/1992 | Abe | 331/46 |

FOREIGN PATENT DOCUMENTS

| 0286879 | 10/1988 | European Pat. Off. |
| 3119117 | 12/1982 | Fed. Rep. of Germany |

*Primary Examiner*—Siegfried H. Grimm
*Attorney, Agent, or Firm*—Michael J. Striker

[57] ABSTRACT

A circuit arrangement for providing a frequency for a computer circuit is suggested in which, in adition to a quartz oscillator, an additional oscillator which quickly begins to oscillate is provided. To ensure a quick operation of the computer circuit when switching on the computer circuit or after voltage dips, the oscillator which quickly begins to oscillate is first connected with the computer circuit when voltage is applied, so that the resetting processes can proceed very quickly. If the quartz oscillator has begun to oscillate and has reached a stable operating state, a switching is effected from the oscillator which quickly begins to oscillate to the quartz oscillator which takes over from the latter to continue providing a frequency for the computer circuit. The circuit arrangement can also contain a comparator whose inputs are connected to the respective oscillators and which compares the oscillator frequencies of the output signals from both oscillators. The frequency comparator can be connected to a switch which connects one or the other of the oscillators to the input of the computer circuit according to the comparison of oscillator frequencies in the comparator.

11 Claims, 2 Drawing Sheets

PLURAL OSCILLATOR CIRCUIT ARRANGEMENT FOR RAPIDLY RESETTING A COMPUTER CIRCUIT

BACKGROUND OF THE INVENTION

The present invention relates to a circuit arrangement for rapidly generating an oscillating electrical input signal at a predetermined frequency for input to a computer circuit means and, more particularly, to a circuit arrangement for rapidly resetting the computer circuit means with the oscillating electrical input signal. A circuit arrangement for resetting microprocessors has already been suggested in DE-OS 31 19 117. In this circuit arrangement the output signal of the clock generator is used for the purpose of resetting. To do this, the output signal of the clock generator is rectified and fed to the reset input of the microprocessor. When the supply voltage is switched on, the resetting process of the microprocessor is only concluded when the clock generator of the microprocessor has already begun to oscillate. Undefined states which can occur e.g. when the microprocessor is reset in a voltage-dependent manner but the clock generator has not begun to oscillate are accordingly reliably prevented. But such a resetting process can be of quite long duration under certain circumstances, particularly when generators are used which begin to oscillate only very slowly, e.g. quartz oscillators. Further, a circuit which is already known from the Siemens microcontroller 80C 517 has, in addition to a quartz oscillator, an RC oscillator which serves to monitor the quartz oscillator.

SUMMARY OF THE INVENTION

It is an object of the present invention to provide an improved circuit arrangement for supplying an oscillating electrical signal at a predetermined frequency to a computer circuit means advantageously for resetting a computer circuit, which does not have the above-mentioned disadvantage.

According to the invention the circuit arrangement for supplying an oscillating electrical signal at a predetermined frequency to computer circuit means comprises a voltage supply means for supplying a voltage; a first oscillator means connectable with the computer circuit means and the voltage supply means and being operable to produce a first oscillating electrical output signal when the voltage from the voltage supply means is applied thereto; a second oscillator means connectable with the voltage supply means and the computer circuit means and operable to produce a second oscillating electrical output signal and being structured to begin oscillating more quickly than the first oscillator means when the voltage of the voltage supply means is applied thereto (i.e. the frequency of the second oscillator increases more rapidly than that of the first oscillator when voltage is applied to it); means for connecting the second oscillator means with the computer circuit means acting to connect the second oscillator means and the computer circuit means when the voltage from the voltage supply means is greater than a preset minimum supply voltage and is applied to the second oscillator means; and means for connecting the first oscillator means with the computer circuit means after a predetermined time period beginning at a time of connection of the second oscillator means with the computer circuit means.

Advantageously in a preferred embodiment of the invention the first oscillator comprises a quartz oscillator and the second oscillator comprises an RC oscillator.

In contrast, the circuit arrangement according to the invention has the advantage that it is possible to set the computer circuit in operation very quickly since the computer circuit is first operated with an oscillator which begins very quickly to oscillate, but is possibly more unstable with respect to frequency, and is only then switched to an oscillator which slowly begins to oscillate, preferably a quartz oscillator which takes longer to start oscillating. Because of this step it is possible to set the computer circuit in operation very quickly at the occurrence of supply voltage so that the initialization process of the computer circuit has already been concluded when switching to the quartz oscillator. The step according to the invention also enables reliable starting in addition to quick starting of the computer circuit since the computing work can also be started in this case in a known manner after the oscillation of the oscillator which quickly begins to oscillate.

It is particularly advantageous to provide a comparison means in which the output signals of the first oscillator means which slowly begins to oscillate are compared with the output signals of the second oscillator means which quickly begins to oscillate and switching to the first oscillator means e.g. to the quartz oscillator is effected the frequency, e.g. of the quartz oscillator, lies in the frequency range of the oscillator which quickly begins to oscillate. In this case, it is ensured in a particularly simple manner that the first oscillator means which slowly begins to oscillate is already in the steady operating state at the moment of switching, so that the computer circuit can continue to work with the quartz oscillator as clock generator immediately after switching. Switching is therefore effected when the first oscillator means, e.g. quartz oscillator is already ready for operation. It is likewise advantageous to provide a voltage monitoring means which causes the oscillators to be started or released only when the voltage has reached a predetermined value. As a result of this step excessively low signals of the oscillators do not trigger faulty functioning of the computer circuit means. On the contrary, the oscillator means are only turned on when it is ensured that at least the oscillator which quickly begins to oscillate is capable of sending a usable frequency signal.

Further, it is advantageous to generate the resetting signal required for resetting the computer circuit means directly from the output signals of the oscillators in that the resetting signal required for the computer circuit means is set in the "active" state, i.e. in which it initiates the resetting process of the computer circuits, when the oscillators are switched off and have not begun to oscillate, and in that the "active" state of the resetting signal is also maintained for a determined minimum number of oscillator periods after one of the two oscillators has begun to oscillate and the resetting signal is only then set to the "active" state. A resetting is circuit means which is conventionally required in addition for the resetting process of the computer circuit and which generates a resetting signal of determined duration as a function of the presence of the supply voltage can accordingly be dispensed with.

Further, in another embodiment of the invention it is advantageous to arrange a counting means subsequent to the quartz oscillator, which counting means actuates the changeover switch at a predetermined counter reading. It is possible as a result of this step to detect in a particularly simple manner the quartz oscillator which has begun to oscillate.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENTS

Figure 1:
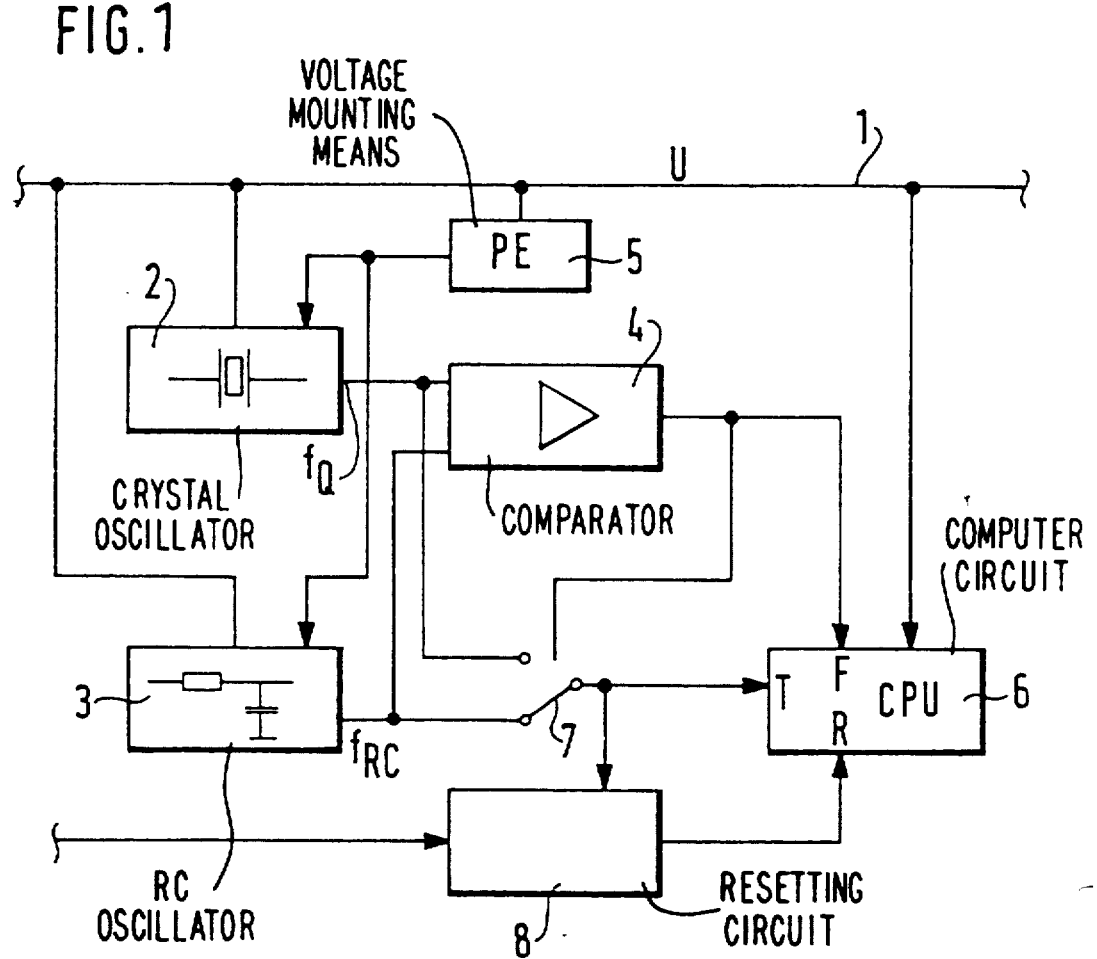
FIG. 1 is a block diagram of one embodiment of a circuit arrangement for resetting a computer circuit according to the invention.

In FIG. 1 the supply voltage line to which the supply voltage U is applied is designated by 1. A quartz oscillator which is supplied with supply voltage by the supply voltage line 1 is designated by 2. The output of the quartz oscillator with output frequency $f_Q$ is connected with an input of a comparator 4 on the one hand and with a input contact of the switch 7 on the other hand. Moreover, an oscillator 3 which quickly begins to oscillate, e.g. an RC oscillator, is provided which is likewise connected in turn with the supply voltage line 1. The RC oscillator 3 which quickly begins to oscillate likewise has a frequency output which is connected on the one hand with another input of the comparator 4 and on the other hand with another input contact of the switch 7. An output signal of the frequency $f_{RC}$ is available at this frequency output. The output of the comparator 4 is connected with the switching contact of the switch 7. The input T of a computer circuit 6 is connected via switch 7 with either the output of the quartz oscillator 2 or the RC oscillator 3 according to the position of the switch 7. Moreover, the output of the comparator 4 is also connected with another interrogation input F of the computer circuit 6. The computer circuit 6 is also supplied with supply voltage by the supply voltage line 1. Finally, the circuit arrangement according to FIG. 1 also has a voltage monitoring unit 5. The voltage monitoring unit 5 sends signals at its output to the oscillators 2 and 3 which only occur when a presettable minimum supply voltage is available at the voltage line 1. The signals of the voltage monitoring device 5 make it possible to switch off the output of the oscillators 2 and 3 when a predetermined minimum voltage is not present at the voltage monitoring device 5 or to interrupt the voltage supply to the oscillators 2 and 3.

The output of the switch 7 is further connected with the resetting circuit 8, whose output is connected with the resetting input R of the computer circuit 6. The output of the resetting circuit 8 remains in its active state, which initiates the resetting of the computer circuit 6, until a predetermined number of oscillator oscillations corresponding at least to the number of clock pulses of the basic initialization has occurred at the start of the switch 7.

Beyond this, the reset input R can likewise be set to the active state via the additional reset input of the reset circuit 8.

Figure 2:
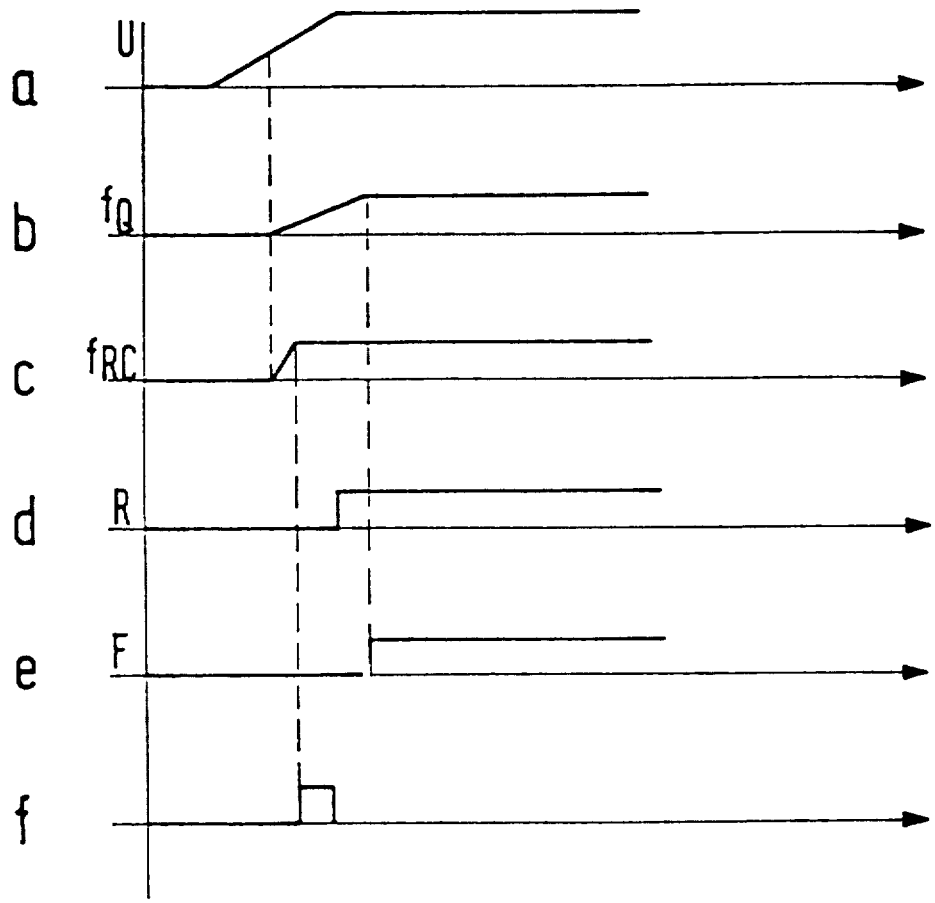
FIG. 2 are graphical illustrations of electrical parameters at various locations in the circuit arrangement according to the invention during operation of the circuit.

The operation of the circuit arrangement according to FIG. 1 is explained in more detail with reference to the diagram according to FIG. 2. After a voltage dip or when switching on the device a voltage build-up occurs at the supply voltage line 1, as is shown in FIG. 2a by way of example. The voltage climbs slowly from zero to its maximum value. If the predetermined minimum supply voltage is achieved the supply voltage to the oscillators 2 and 3 is applied to both oscillators by the voltage monitoring device 5, so that both the quartz oscillator, as is shown in FIG. 2b, and the RC oscillator, as is shown in FIG. 2c, begin to oscillate. Since the RC oscillator 3 reaches its operating frequency substantially faster it is possible to start the computer circuit 6 in operation for initialization according to FIG. 2f already when the RC oscillator has begun to oscillate. It is then possible to start the computer circuit in operation with the rising edge of the signal according to FIG. 2d, since initialization processes of the computer module are processed.

The output frequencies of the quartz oscillator 2 and the RC oscillator 3 are compared with one another in the comparison device 4. Conventional counting devices, for example, can possibly be used as such comparison devices. The counting devices send digital values at their output after a certain period of time and these value readings can be compared with one another. If the frequency of the quartz oscillator lies below the frequency of the RC generator it is assumed that the quartz oscillator is not yet in the regular steady state. When the frequency of the quartz oscillator reaches or exceeds the frequency of the RC oscillator it is assumed that the quartz oscillator has now reached its operating range. A signal is now sent at the output of the comparator 4 so that the signal of the quartz oscillator is now directed according to FIG. 2e to the computer circuit 6 which is advantageously constructed as a microprocessor, while the signal of the RC oscillator is switched off. At the same time, according to FIG. 2e, an input F of the computer circuit 6 is switched so that the computer circuit 6 can be interrogated as to which oscillator is operating.

As is shown by a comparison of FIGS. 2f and 2e, the step according to the invention makes it possible to start the computer circuit 6 in operation at the recurrence of the supply voltage on line 1 more promptly than would be the case if there were only a quartz oscillator.

After the initialization phase is concluded (trailing edge according to FIG. 2f) the computer unit can immediately start the computer program, since the resetting input R is released after a predetermined number of pulses by the resetting circuit 8 according to FIG. 2d. If time-dependent programs are present it can be determined by interrogating the input F whether or not the quartz oscillator 2 is already switched on and the frequency is stable. Otherwise, it would be preferable to process fewer time-dependent programs or the program can run in a loop until the quartz oscillator 2 is switched on. Further, the program can be prevented from running when the quartz oscillator 2 is not operating properly or switching to a corresponding emergency program can be effected.

The frequency of the RC oscillator 3 is advisably selected in such a way that it lies just below the frequency of the steady-state quartz oscillator. Accordingly the amplitude of the quartz oscillator need no longer be monitored. Rather, it can be assumed that the quartz oscillator only works properly when it exceeds the frequency of the RC oscillator, so that a purely digital comparison in the comparator 4 is sufficient. The predetermined period for connecting the quartz oscillator 3 with the computer circuit 6 is then determined by the comparator 4.

Due to the digital construction of the comparator it is possible to integrate the entire circuit arrangement in the computer unit since, with the exception of the frequency processing of the oscillators, only digital components are used. The entire circuit arrangement can therefore easily be built on a common chip in connection with the microprocessor so that the circuit arrangement can be arranged in the computer circuit 6.

It is even possible in principle to dispense with the comparator 4 entirely. In this case a time function element is to be provided which switches the switch 7 after a predetermined period of time which is at least as long as the time usually required by the quartz oscillator to begin oscillating, so that the quartz oscillator then assumes the task of supplying the computer circuit. A simple time function element is sufficient for this purpose, so that the circuit arrangement according to FIG. 1 can be further simplified. However, emergency operation of the computer unit is no longer possible since the computer circuit in the construction according to FIG. 1 also still works when the quartz oscillator or RC oscillator no longer begins to oscillate e.g. because of defects. That is, the switching is not effected by the comparison device when the quartz oscillator does not begin to oscillate or the computer device is only set in operation after a delay in case the oscillator which quickly begins to oscillate does not start to operate. Therefore increased operating reliability is achieved due to the circuit arrangement as a result of the redundancy.

The circuit arrangement according to FIG. 1 can be used to advantage particularly when a quick real-time processing is important in the operation of machines and appliances, e.g. in the operation of control devices of motor vehicles where increased environmental demands presuppose a higher loading capacity of the components and the individual component groups. At the same time, particularly in control devices in motor vehicles, it is expected that they reach operation-ready state very quickly after switching on the battery voltage when turning the ignition key, which is to be realized by the circuit arrangement according to FIG. 1.

Figure 3:
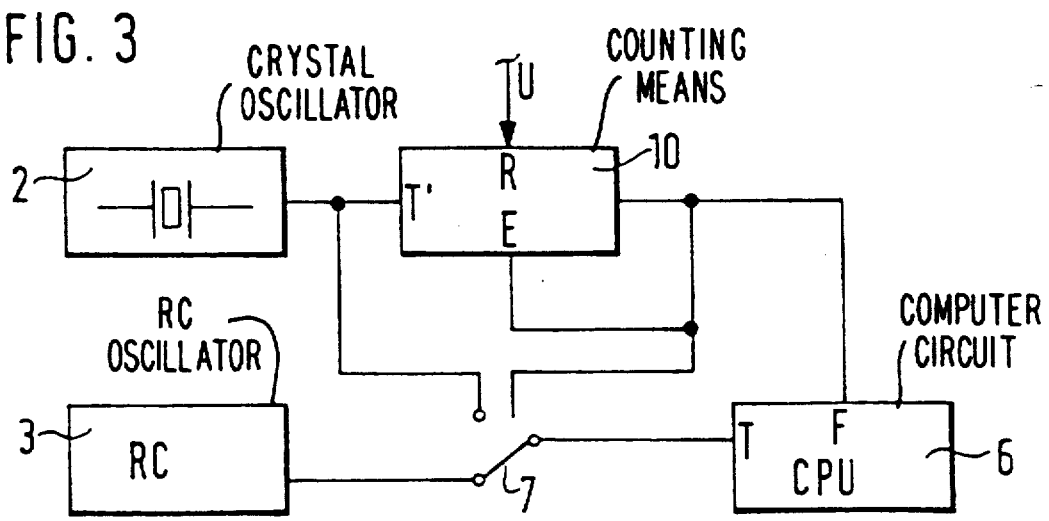
FIG. 3 is a block diagram of another embodiment of a circuit arrangement according to the invention.

Another simple embodiment example for detecting the quartz oscillator can be seen from FIG. 3 which shows only those parts which are changed from FIG. 1. The quartz oscillator 2 oscillator 3 are again connected with respective input contacts of the changeover switch 7. The changeover switch 7 connects the clock input T of the computer circuit 6 with the output of the RC oscillator 3 in the absence of supply voltage. The output of the quartz oscillator 2 moreover is connected to the clock input T, of a counter 10 which counts the counter 10 upward when the quartz oscillator is vibrating. When a predetermined counter reading is reached the counter switches at its output and accordingly actuates the switch 7. At the same time, a signal is switched at an input F of the computer circuit 6, so that the computer circuit can detect which oscillator is connected to its input T. The same signal serves, via the input E o counter 10, to block the clock input of the counter so that additional clock pulses of the quartz oscillator can no longer reach the counter. The counter therefore remains at the predetermined counter reading, which leads to the switching of the switch 7 until a reset signal is triggered because of an interruption of the supply voltage at its input R, so that the counter can count up again, e.g. from the value 0.

This step likewise enables a very simple possibility for detecting the start of oscillation of the quartz oscillator. If the quartz oscillator has not yet begun to oscillate in a regular manner or if the amplitude of its signals is still small, the counter 10 will not respond. If the counter 10 does respond this still does not mean that the quartz oscillator has reached its nominal frequency and its amplitude. For this reason the signals of the quartz oscillator are counted and switched after a predetermined period of time during a predetermined period of time determined by the count value of the counter 10. Likewise as a result of this step the quartz oscillator is put in operation very quickly, namely when it has reached its operating range based on the counter reading in the counter 10.

The connection from the output of the counter 10 or from the output of the comparator 4 to the input F of the computer circuit is not necessary when time-independent programs are to be run. This line can be dispensed with in this case since it then makes no difference whether or not the computer receives a relatively constant or less constant clock pulse. However, if time-critical processes are to be serviced in the program, e.g. programs which determine the ignition or injection time in the motor vehicle, these programs may not be processed as long as there is a relatively unstable clock pulse at the input of the computer unit. In this case the signal at the input F is to be interrogated beforehand and these programs are to be released only when the stable clock pulse is already switched on.

By "oscillating more quickly" in the following claims we mean that the oscillator frequency increases faster when the oscillator is turned on or when voltage is applied by the voltage source.

It will be understood that each of the elements described above, or two or more together, may also find a useful application in other types of constructions differing from the types described above.

While the invention has been illustrated and described as embodied in a circuit arrangement for rapidly resetting a computer circuit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

1. Circuit arrangement for supplying an oscillating electrical signal at a predetermined frequency to a computer circuit comprising:
a voltage supply means for supplying a voltage;
a first oscillator means connectable with a computer circuit means and the voltage supply means, said first oscillator means being operable to produce a first oscillating electrical output signal having a frequency when the voltage from the voltage supply means is applied thereto;

a second oscillator means connectable with the voltage supply means and the computer circuit means and operable to produce a second oscillating electrical output signal having a frequency, the second oscillator means being structured to begin oscillating more quickly than the first oscillator means when the voltage of the voltage supply means is applied thereto;

means for connecting the second oscillator means with the computer circuit means, said means for connecting the second oscillator means to the computer circuit means acting to connect the second oscillator means and the computer circuit means when the voltage from the voltage supply means is greater than a preset minimum supply voltage and is applied to the second oscillator means; and means for connecting the first oscillator means with the computer circuit means after a predetermined time period beginning at a time of connection of the second oscillator means with the computer circuit means.

2. The circuit arrangement according to claim 1, wherein the first oscillator means comprises a quartz oscillator and the second oscillator means comprises an RC oscillator.

3. The circuit arrangement according to claim 1, further comprising comparison means connected to the first and second oscillator means to receive the oscillating electrical output signals from both oscillator means and to compare frequencies of the respective oscillating electrical output signals, and switching means connected with and controlled by the comparison means so that the switching means connects the first oscillator means with the computer circuit means to provide the oscillating electrical output signal of the first oscillator means to the computer circuit means when the frequency of the oscillating electrical output signal of the first oscillator means approximately reaches the frequency of the oscillating electrical output signal of the second oscillator means so as to determine the predetermined time period.

4. The circuit arrangement according to claim 1, further comprising counting means connected to the first oscillator means and switching means connected with and controlled by the counting means so that the switching means connects the first oscillator means with the computer circuit means to provide the oscillating electrical output signal of the first oscillator means to the computer circuit means when the counting means reaches a predetermined counter state so as to determine the predetermined time period.

5. The circuit arrangement according to claim 3, wherein the comparison means connected to the switching means produces a switching signal for switching the switching means and the computer circuit means has a switching signal input connected to the comparison means to receive the switching signal.

6. The circuit arrangement according to claim 4, wherein the counting means connected to the switching means produces a switching signal for switching the switching means and the computer circuit means has a switching signal input connected to the counting means to receive the switching signal.

7. The circuit arrangement according to claim 1, wherein the computer circuit means has a reset input for receiving a reset signal for resetting the computer circuit means, and further comprising resetting circuit means connected to the reset input of the computer circuit means, said resetting circuit means providing the reset signal at the reset input until a predetermined number of oscillations of one of the oscillating electrical signals are received by the computer circuit means from one of the oscillator means.

8. The circuit arrangement according to claim 1, further comprising a voltage monitoring means connected to the oscillators and the voltage supply means, said voltage monitoring means acting to set the oscillators in operation when the voltage of the voltage supply means is greater than the preset minimum supply voltage.

9. Circuit arrangement for supplying an oscillating electrical signal at a predetermined frequency to a computer circuit comprising:

a voltage supply means for supplying a voltage;

a first oscillator means connectable with a computer circuit means and the voltage supply means, said first oscillator means being operable to produce a first oscillating electrical output signal having a frequency when the voltage from the voltage supply means is applied thereto;

a second oscillator means connectable with the voltage supply means and the computer circuit means and operable to produce a second oscillating electrical output signal having a frequency, the second oscillator means being structured so that the frequency of the second oscillating electrical output signal increases more quickly than the frequency of the first oscillating electrical output signal of the first oscillator means when the voltage of the voltage supply means is applied to both of the oscillator means;

voltage monitoring means connected to the oscillators and the voltage supply mean, said voltage monitoring means acting to set the oscillators in operation when the voltage of the voltage supply means is greater than a preset minimum supply voltage means for connecting the second oscillator means with the computer circuit means, said means for connecting the second oscillator means to the computer circuit means acting to connect the second oscillator means and the computer circuit means when the voltage from the voltage supply means is applied to the second oscillator means;

means for connecting the first oscillator means with the computer circuit means after a predetermined time period beginning at a time of connection of the second oscillator means with the computer circuit means; and resetting circuit means connected to a reset input of the computer circuit means, said resetting circuit means providing a reset signal at the reset input until a predetermined number of oscillations of one of the oscillating electrical signals are received by the computer circuit means from one of the oscillator means.

10. The circuit arrangement according to claim 9, further comprising comparison means connected to the first and second oscillator means to receive the oscillating electrical output signals from both oscillator means and to compare frequencies of the respective oscillating electrical output signals, and switching means connected with and controlled by the comparison means so that the switching means connects the first oscillator means with the computer circuit means to provide the oscillating electrical output signal of the first oscillator means to the computer circuit means when the frequency of the oscillating electrical output signal of the first oscillator means approximately reaches the frequency of the oscillating electrical output signal of the second oscillator means so as to determine the predetermined time period, said means for connecting the first oscillator means with the computer circuit means comprising the switching means and said means for connecting the second oscillator means with the computer circuit means comprising the switching means.

11. The circuit arrangement according to claim 9, further comprising counting means connected to the first oscillator means and switching means connected with and controlled by the counting means so that the switching means connects the first oscillator means with the computer circuit means to provide the oscillating electrical output signal of the first oscillator means to the computer circuit means when the counting means reaches a predetermined counter state so as to determine the predetermined time period.

* * * * *